(12) United States Patent
Auyer et al.

(10) Patent No.: US 11,920,838 B2
(45) Date of Patent: Mar. 5, 2024

(54) CHARGING PORT COUPLER

(71) Applicant: Carrier Corporation, Palm Beach Gardens, FL (US)

(72) Inventors: Douglas R. Auyer, Clay, NY (US); Ping S. Vang, Liverpool, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 449 days.

(21) Appl. No.: 16/949,968

(22) Filed: Nov. 23, 2020

(65) Prior Publication Data

US 2021/0190400 A1 Jun. 24, 2021

Related U.S. Application Data

(60) Provisional application No. 62/949,478, filed on Dec. 18, 2019.

(51) Int. Cl.
*F25B 45/00* (2006.01)

(52) U.S. Cl.
CPC ........ *F25B 45/00* (2013.01); *F25B 2345/001* (2013.01); *F25B 2345/006* (2013.01)

(58) Field of Classification Search
CPC ......... F16L 15/008; F16L 29/02; F16L 15/04; F16L 15/006; F25B 45/00
See application file for complete search history.

(56) References Cited

U.S. PATENT DOCUMENTS

| 4,537,384 | A | * | 8/1985 | Petersen | ............... | F16K 15/063 |
| | | | | | | 137/542 |
| 5,244,010 | A | | 9/1993 | Barjasteh | | |
| 5,339,862 | A | | 8/1994 | Haunhorst | | |
| 5,415,200 | A | | 5/1995 | Haunhorst | | |
| 5,450,875 | A | | 9/1995 | Chichester | | |
| 10,458,590 | B2 | | 10/2019 | Attia | | |
| 2008/0061259 | A1 | * | 3/2008 | Reginaldo | .......... | B60H 1/00585 |
| | | | | | | 251/148 |

FOREIGN PATENT DOCUMENTS

| EP | 0134062 A1 | 3/1985 |
| FR | 896783 A | 3/1945 |

OTHER PUBLICATIONS

Extended European Search Report received for EP Application No. 20208313.5, dated Apr. 29, 2021, 10 Pages.

* cited by examiner

*Primary Examiner* — Ana M Vazquez
(74) *Attorney, Agent, or Firm* — Patricia S. Whitehouse

(57) ABSTRACT

A coupler for connecting to a port, and a method for connecting a coupler to a port are provided. The coupler includes a body, a plunger needle, and a threaded portion. The body includes a radially outward facing surface, a radially inward facing surface, a proximal end, and a distal end. The plunger needle is fixed to the body, and extends in parallel with the body toward the distal end of the body. The threaded portion extends circumferentially around at least a portion of the radially outward facing surface of the body toward the distal end of the body, the threaded portion configured to receive a threaded portion of the port.

18 Claims, 4 Drawing Sheets

CHARGING PORT COUPLER

CROSS REFERENCE TO A RELATED APPLICATION

The application claims the benefit of U.S. Provisional Application No. 62/949,478 filed Dec. 18, 2019, the contents of which are hereby incorporated in their entirety.

BACKGROUND

A coupler, sometimes referred to as a "quick coupler", is a device that is used to quickly and easily connect to a service port. The connection between a coupler and a service port enables the passage of a fluid. For example, the connection between a coupler and a service port can be used to allow the passage of a refrigerant to recharge a refrigeration system.

Conventional quick couplers use a locking ball mechanism to secure the coupler to the service port. The locking balls extend from an inner surface of the coupler toward the center of the coupler, and are capable of extending radially inward and outward. To connect the conventional quick coupler to the service port, the inner surface of the coupler is placed over the outer surface of the service port. As the coupler is placed over the service port, the locking balls extend and set into a recess of the service port. To extend the locking balls in an outward direction, toward the recess of the service port, conventional quick couplers often use a coupler spring.

Once the quick coupler and the service port are secured together, conventional quick couplers engage a moveable pin in the coupler to push the moveable pin toward a valve in the service port. When the valve is pushed by the moveable pin, a channel is opened between the coupler and the service port. The moveable pin, often used by conventional quick couplers, is sometimes engaged with a rotatable handle. The channel created between the coupler and the service port allows fluid to flow from the coupler to the service port.

As described above, conventional quick couplers can be very complex, and can include multiple moving components. Accordingly, there remains a need for a coupler, and method of connecting a coupler to a port, that has reduced complexity while still creating a channel to enable the passage of at least one fluid from the coupler to the port.

BRIEF DESCRIPTION

According to one embodiment, a coupler for connecting to a port is provided. The coupler includes a body, a plunger needle, and a threaded portion. The body includes a radially outward facing surface, a radially inward facing surface, a proximal end, and a distal end. The plunger needle is fixed to the body. The plunger needle extends in parallel with the body toward the distal end of the body. The threaded portion extends circumferentially around at least a portion of the radially outward facing surface of the body toward the distal end of the body. The threaded portion configured to receive a threaded portion of the port.

In accordance with additional or alternative embodiments, the plunger needle is immovable relative to the body.

In accordance with additional or alternative embodiments, the plunger needle is positioned approximately central to the body.

In accordance with additional or alternative embodiments, the plunger needle is configured to compress a Schrader valve of the port.

In accordance with additional or alternative embodiments, when the plunger needle compresses the Schrader valve of the port, a channel is created between the coupler and the port, the channel configured to permit the flow of at least one fluid between the coupler and the port.

In accordance with additional or alternative embodiments, the port includes a threaded portion extending circumferentially around an inner surface of the port toward a distal end of the port.

In accordance with additional or alternative embodiments, the coupler also includes a first O-ring on the radially inward facing surface, the first O-ring configured to create a seal with an outer surface of the port.

In accordance with additional or alternative embodiments, the coupler also include a second O-ring on the radially outward facing surface, the second O-ring configured to create a seal with a distal end of the port.

In accordance with additional or alternative embodiments, the at least one fluid is carbon dioxide ($CO_2$).

In accordance with additional or alternative embodiments, the port meets the specifications of SAE J639.

According to another aspect of the disclosure, a method for connecting a coupler and a port to allow the passage of at least one fluid is provided. The coupler includes a body defining a radially outward facing surface, a plunger needle fixed to the body, and a threaded portion extending circumferentially around at least a portion of the radially outward facing surface. The port includes a threaded portion extending circumferentially around an inner surface and a Schrader valve. The method includes: securing the threaded portion of the coupler to the threaded portion of the port; compressing the Schrader valve of the port with the plunger needle of the coupler to create a channel between the coupler and the port, the channel configured to permit the flow of the at least one fluid between the coupler and the port; and passing the at least one fluid from the coupler to the port through the channel.

In accordance with additional or alternative embodiments, the plunger needle is immovable relative to the body.

In accordance with additional or alternative embodiments, the plunger needle extends in parallel with the body toward a distal end of the body.

In accordance with additional or alternative embodiments, the plunger needle is positioned approximately central to the inner surface of the body.

In accordance with additional or alternative embodiments, the coupler includes a first O-ring on a radially inward facing surface, the first O-ring configured to create a seal with an outer surface of the port.

In accordance with additional or alternative embodiments, the seal prevents the leakage of the at least one fluid.

In accordance with additional or alternative embodiments, the coupler includes a second O-ring on the radially outward facing surface, the second O-ring configured to create a seal with a distal end of the port.

In accordance with additional or alternative embodiments, the seal prevents the leakage of the at least one fluid.

In accordance with additional or alternative embodiments, the at least one fluid is carbon dioxide ($CO_2$).

In accordance with additional or alternative embodiments, the port meets the specifications of SAE J639.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

A coupler with reduced complexity, when compared to a conventional quick coupler, is provided. The coupler is designed to mate with the port by securing the threaded portion of the coupler with a threaded portion of the port. In certain instances, the threaded portion of the coupler extends circumferentially around at least a portion of a radially outward facing surface. In certain instances, the threaded portion of the port extends circumferentially around an inner surface of the port. The plunger needle of the coupler is fixed to the body of the coupler. By designing the coupler in this manner, the coupler has reduced complexity compared to a conventional quick coupler. Instead of providing a moveable pin to engage the valve of the port, as is done by a conventional quick coupler, the coupler described herein uses a fixed plunger needle.

Figure 1:
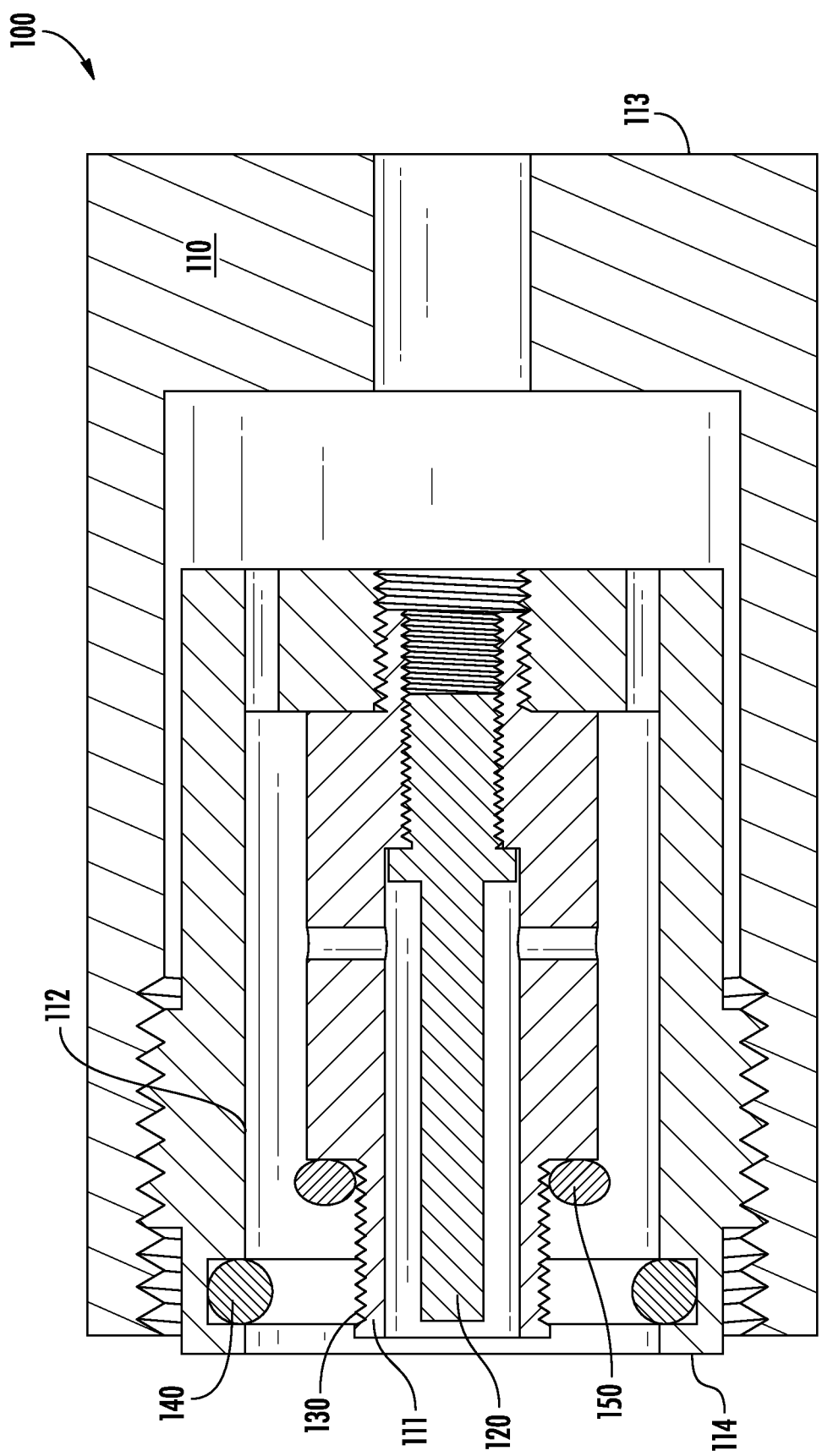
FIG. 1 is a cross-sectional side view of a coupler in accordance with one aspect of the disclosure.

With reference now to the Figures, a cross-sectional side view of a coupler 100, in accordance with various aspects of the disclosure is shown in FIG. 1. This coupler 100, in certain instances, may be referred to as a "quick coupler". As shown in FIG. 1, the coupler 100 includes a body 110, a plunger needle 120, and a threaded portion 130. The body 110 includes a radially outward facing surface 111, a radially inward facing surface 112, a proximal end 113, and a distal end 114. The plunger needle 120 is fixed to the body 110. The plunger needle 120 extends in parallel with the body 110 toward the distal end 114 of the body 110. The threaded portion 130 extends circumferentially around at least a portion of the radially outward facing surface 111 of the body 110 toward the distal end 114 of the body 110. The threaded portion 130 is configured to receive a threaded portion 220 of the port 200.

Figure 2:
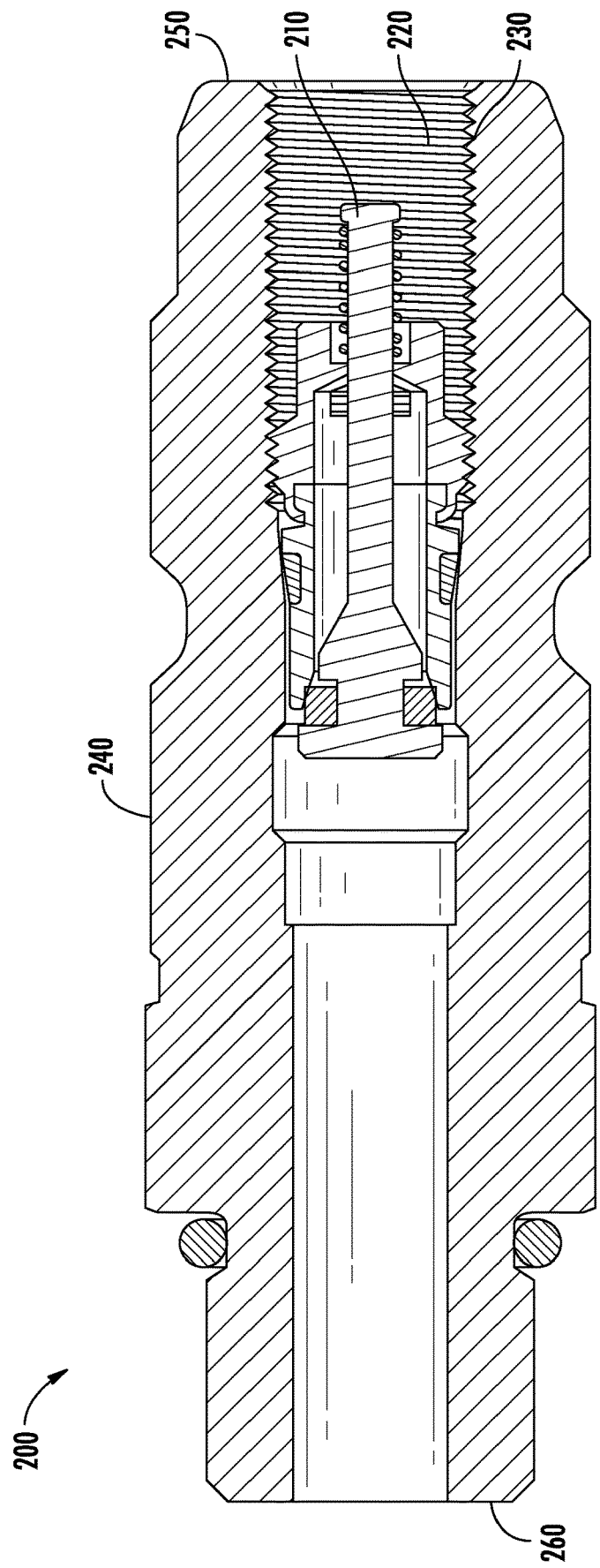
FIG. 2 is a cross-sectional side view of a port in accordance with one aspect of the disclosure.

A cross-sectional side view of a port 200 is shown in FIG. 2. The port 200, in certain instances, may be referred to as a "service port". The port 200, in certain instances, includes a Schrader valve 210, a threaded portion 220 extending circumferentially around an inner surface 230 of the port 200 toward the distal end 250 of the port 200. The proximal end 260 of the port 200 on the opposite end of the port 200 relative to the distal end 250 of the port 200. In certain instances, at least a portion of the outer surface 240 of the port 200 is enveloped by the radially inward facing surface 112 of the coupler 100 when the port 200 and the coupler 100 are connected.

Figure 3:
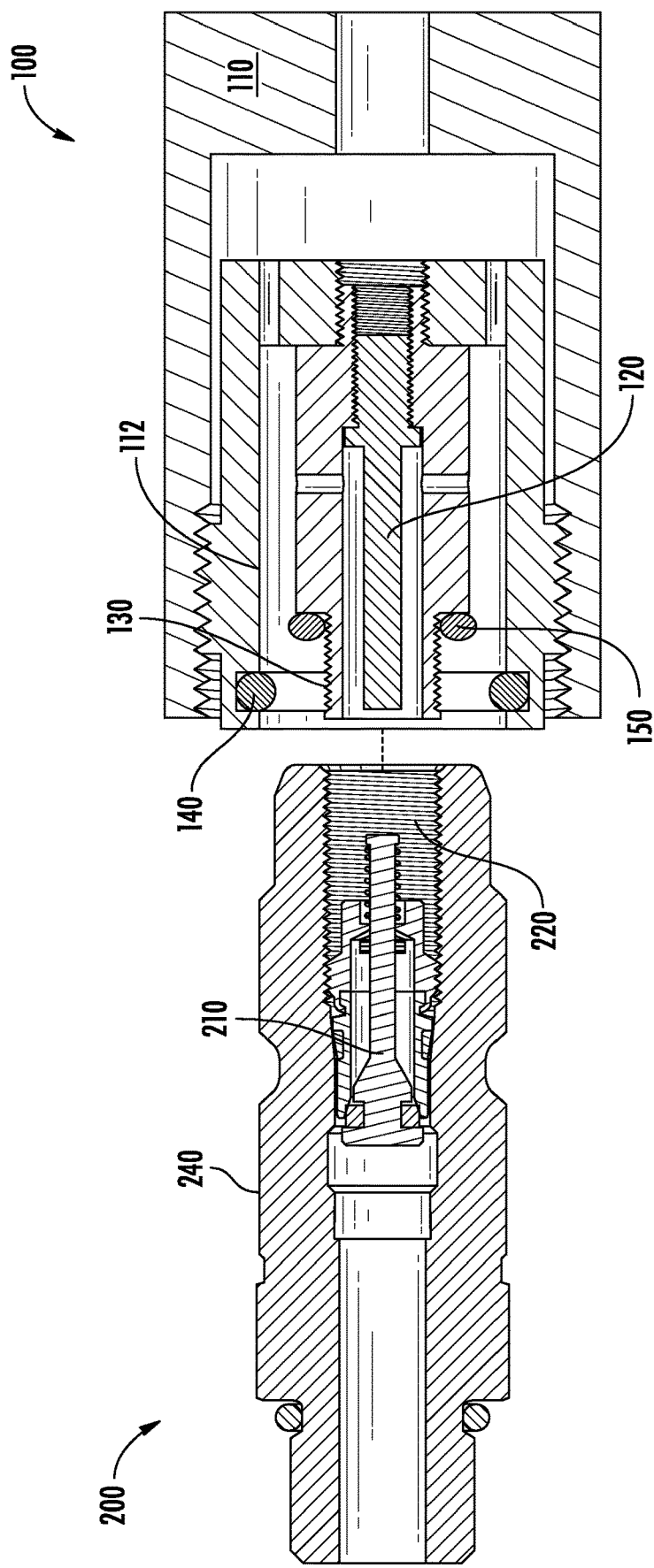
FIG. 3 is a cross-sectional side view of a coupler and a port separated from one another in accordance with one aspect of the disclosure.

As shown in FIG. 3, the coupler 100 is configured to connect with the port 200. The coupler 100, in certain instances, includes a first O-ring 140. The first O-ring 140 may, in certain instances, be located on the radially inward facing surface 112 of the coupler 100. The first O-ring 140, when used by the coupler 100, may be configured to create a seal with the outer surface 240 of the port 200. The coupler 100, in certain instances, includes a second O-ring 150. The second O-ring 150 may, in certain instances, be located on the radially outward facing surface 111 of the coupler 100. The second O-ring 150, when used by the coupler 100, may be configured to create a seal with the distal end 250 of the port 200. In certain instances, the coupler 100 may include the second O-ring 150 without using the first O-ring 140. In certain instances, the coupler 100 may include the first O-ring 140 without using the second O-ring 140. In certain instances, the coupler 100 uses neither the first O-ring 140 nor the second O-ring 150. In certain instances, the coupler 100 uses both the first O-ring 140 and the second O-ring 150.

Figure 4:
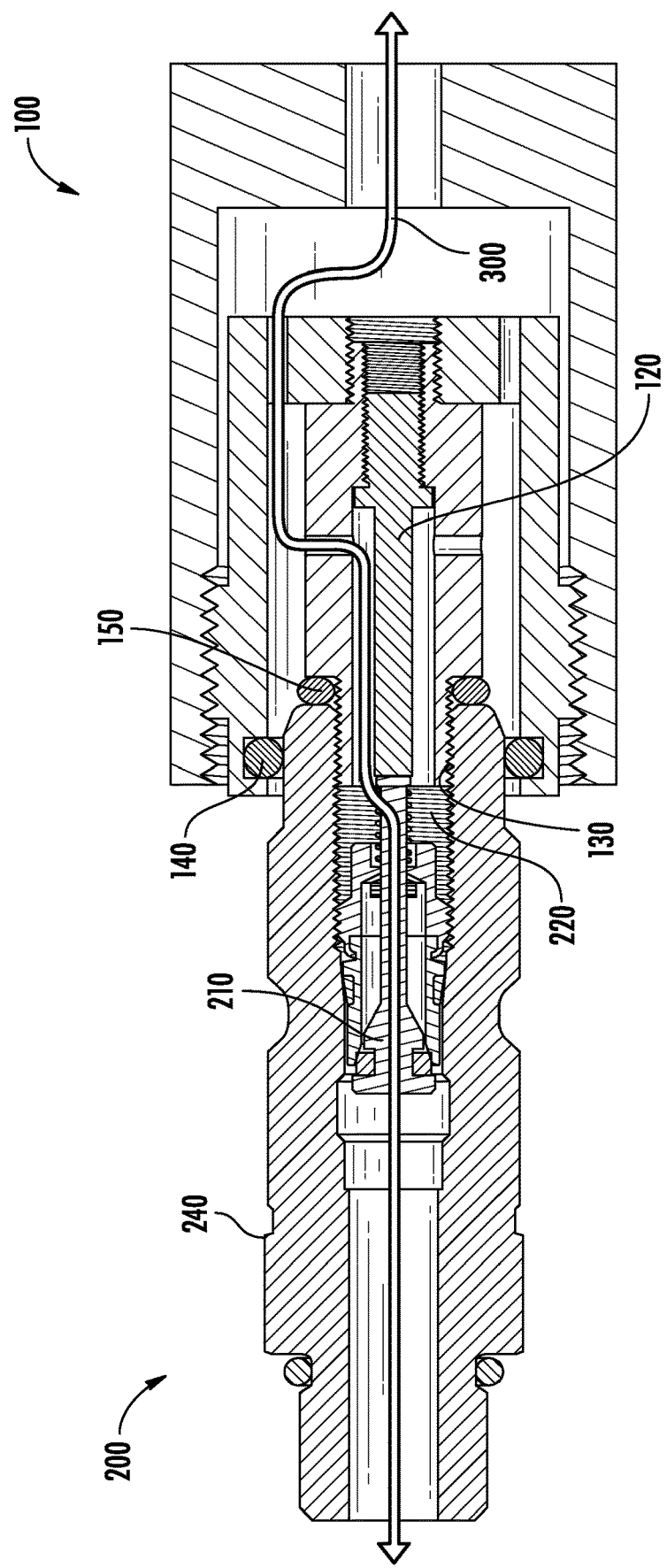
FIG. 4 is a cross-sectional side view of a coupler and a port mated with one another in accordance with one aspect of the disclosure.

The plunger needle 120 of the coupler 100, in certain instances, is configured to compress the Schrader valve 210 of the port 200. The plunger needle 120, in certain instances, is immovable relative to the body 110. To meet the Schrader valve 210 of the port 200, the plunger needle 120 of the coupler 100, in certain instances, is positioned approximately central to the body 110. Approximately central to the body 110, in certain instances, means that equal parts of the body 110 are located above and below the plunger needle 120. The configuration of the plunger needle 120, in certain instances, allows it to meet and compress the Schrader valve 210 of the port 200. When the plunger needle 120 compresses the Schrader valve 220 of the port 200, a channel 300 is created between the coupler 100 and the port 200. As shown in FIG. 4, the channel 300 is configured to permit the flow of at least one fluid (not shown) between the coupler 100 and the port 200. To prevent the fluid from leaking, in certain instances, the coupler 100 includes one or more O-ring 140, 150. This fluid, in certain instances, is carbon dioxide ($CO_2$).

Although it is envisioned that the coupler 100 could be used in any application in which fluid is transferred through a connection, for purposes of simplicity and brevity, the coupler 100 is described in terms of be used in the recharging of a refrigeration system. When being used with a refrigeration system the fluid, in certain instances, may include at least one refrigerant. This refrigerant may, in certain instances, be carbon dioxide ($CO_2$). The refrigeration system, in certain instances, may use a port 200 that meets the specifications of SAE J639. The coupler 100, in certain instances, is provided to connect with a port 200 that meets the specifications of SAE J639. This specification is set by the Society of Automotive Engineers (SAE). The design and configuration of the components of the coupler 100, enable a simplistic method of connecting the coupler 100 to a port 200 to allow the passage of at least one fluid. In certain instances, the design and configuration of the components of the coupler 100 allow for the connecting to a port 200 that meets the specifications of SAE J639. By designing the port 100 to be able to connect to a standardized port 200, the port 200, in certain instances, does not need to be customized, making the coupler 100 usable across different industries (ex. any industry utilizing a port 200 meeting the specifications of SAE J639).

The method of connecting a coupler and a port enables the passage of at least one fluid. The method may be done, for example, using exemplary coupler 100, as shown in FIG. 1, and exemplary port 200, as shown in FIG. 2. The method provides for the securing of the threaded portion 130 of the coupler 100 to the threaded portion 220 of the port 200. As the threaded portion 130 of the coupler 110 and the threaded portion 220 of the port 200 are secured, the plunger needle 120 of the coupler 100 and the Schrader valve 210 of the port 200 become closer to one another. When the plunger needle 120 and the Schrader valve 220 meet, the Schrader valve 210 of the port 200 is compressed with the plunger needle 120 of the coupler 100 to create a channel 300 between the coupler 100 and the port 200. The channel 300 is configured to permit the flow of at least one fluid between the coupler 100 and the port 200, as shown in FIG. 4. Once the channel 300 is created, at least one fluid (not shown) can be passed from the coupler 100 to the port 200 through the channel 300. To prevent the channel 300 from leaking fluid, in certain instances, the coupler 100 may include one or more O-ring 140, 150. When including an O-ring 140, 150 in the coupler 200, a seal is created between the O-ring(s) 140, 150 of the coupler 100 and the port 200.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A coupler for connecting to a port, the coupler comprising:
    a body defining a radially outward facing surface, an opposing radially inward facing surface, a proximal end, and a distal end;
    a plunger needle fixed to the body, the plunger needle extending in parallel with the body toward the distal end of the body;
    a threaded portion extending circumferentially around at least a portion of the radially outward facing surface of the body toward the distal end of the body, the threaded portion configured to receive a threaded portion of the port; and
    a first O-ring on the radially inward facing surface, the first O-ring configured to create a seal with an outer surface of the port.

2. The coupler of claim 1, wherein the plunger needle is immovable relative to the body.

3. The coupler of claim 1, wherein the plunger needle is positioned approximately central to the body.

4. The coupler of claim 1, wherein the plunger needle is configured to compress a Schrader valve of the port.

5. The coupler of claim 4, wherein when the plunger needle compresses the Schrader valve of the port, a channel is created between the coupler and the port, the channel configured to permit the flow of at least one fluid between the coupler and the port.

6. The coupler of claim 5, wherein the at least one fluid is carbon dioxide ($CO_2$).

7. The coupler of claim 1, wherein the port comprises a threaded portion extending circumferentially around an inner surface of the port toward a distal end of the port.

8. The coupler of claim 1, further comprising a second O-ring on the radially outward facing surface, the second O-ring configured to create a seal with a distal end of the port.

9. The coupler of claim 1, wherein the port meets the specifications of SAE J639.

10. A method for connecting a coupler and a port to allow passage of at least one fluid, the coupler comprising a body defining a radially outward facing surface, an opposing radially inward facing surface, a plunger needle fixed to the body, and a threaded portion extending circumferentially around at least a portion of the radially outward facing surface, the port comprising a threaded portion extending circumferentially around an inner surface and a Schrader valve, the method comprising:
    securing the threaded portion of the coupler to the threaded portion of the port;
    compressing the Schrader valve of the port with the plunger needle of the coupler to create a channel between the coupler and the port, the channel configured to permit the flow of the at least one fluid between the coupler and the port; and
    passing the at least one fluid from the coupler to the port through the channel;
    wherein the coupler comprises a first O-ring on the radially inward facing surface, the first O-ring configured to create a seal with an outer surface of the port.

11. The method of claim 10, wherein the plunger needle is immovable relative to the body.

12. The method of claim 10, wherein the plunger needle extends in parallel with the body toward a distal end of the body.

13. The method of claim 10, wherein the plunger needle is positioned approximately central to an inner surface of the body.

14. The method of claim 11, wherein the seal prevents leakage of the at least one fluid.

15. The method of claim 10, wherein the coupler comprises a second O-ring on the radially outward facing surface, the second O-ring configured to create a seal with a distal end of the port.

16. The method of claim 15, wherein the seal prevents leakage of the at least one fluid.

17. The method of claim 10, wherein the at least one fluid is carbon dioxide ($CO_2$).

18. The method of claim 10, wherein the port meets the specifications of SAE J639.

* * * * *